United States Patent [19]

Fesler

[11] Patent Number: 5,121,831
[45] Date of Patent: Jun. 16, 1992

[54] GRATE CONVEYOR LINK AND METHOD OF MANUFACTURE

[75] Inventor: Dennis J. Fesler, Des Peres, Mo.

[73] Assignee: Carondelet Foundry Company, St. Louis, Mo.

[21] Appl. No.: 462,061

[22] Filed: Jan. 8, 1990

[51] Int. Cl.$^5$ .............................................. B65G 17/06
[52] U.S. Cl. ...................................... 198/853; 474/234
[58] Field of Search ................. 198/851, 853; 474/234

[56] References Cited

U.S. PATENT DOCUMENTS

| | | | |
|---|---|---|---|
| 570,637 | 11/1896 | Holt | 474/234 |
| 3,063,696 | 11/1962 | Culling | 266/21 |
| 3,735,858 | 5/1973 | Hartwig | 198/853 |
| 3,745,670 | 7/1973 | Hartwig | 34/217 |

Primary Examiner—Joseph E. Valenza
Attorney, Agent, or Firm—Senniger, Powers, Leavitt & Roedel

[57] ABSTRACT

An improved link for a grate conveyor or the like, which is an elongate casting having at a first end thereof a pair of transversely spaced side walls and at the other or second end thereof a lug having a width generally corresponding to the width of the space between said walls and extending out endwise at said second end. The lug is adapted to fit between the spaced side walls of the next link in a series of links making up the chain. The side walls have aligned holes therein of circular cross section coaxial on a first axis extending transversely of the link adjacent its first end. The lug also has a hole therein of circular cross section on a second axis extending transversely of the link adjacent its second end wherein the second axis is parallel to the first axis. The link is cast of a metallic material and has inserts of a harder material extending partially around the circumference of each of the holes in said side walls at that side of each of those holes toward the first end of the link and an insert of a harder material extending partially around the circumference of the hole in the lug at that side of the hole toward the second end of the link.

10 Claims, 4 Drawing Sheets

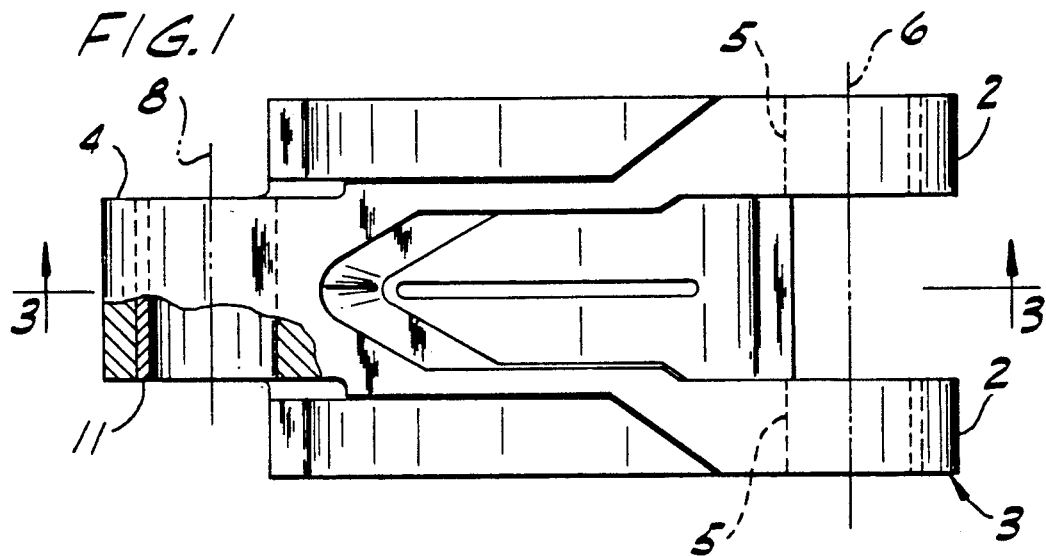
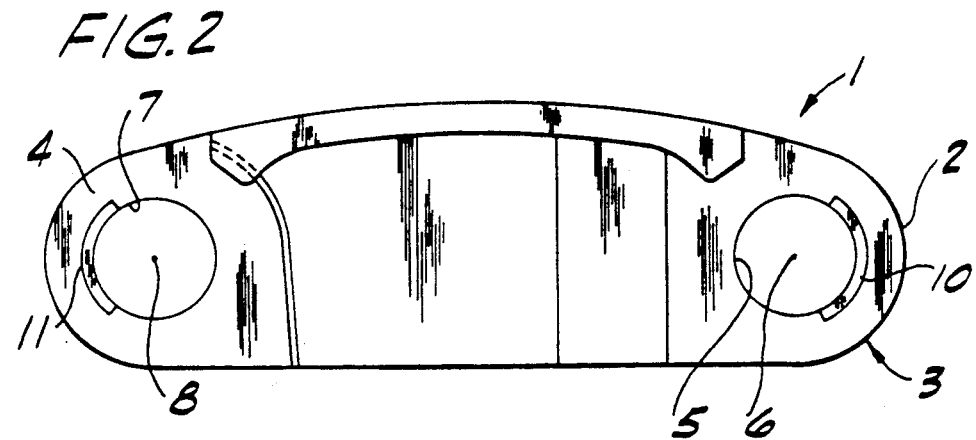
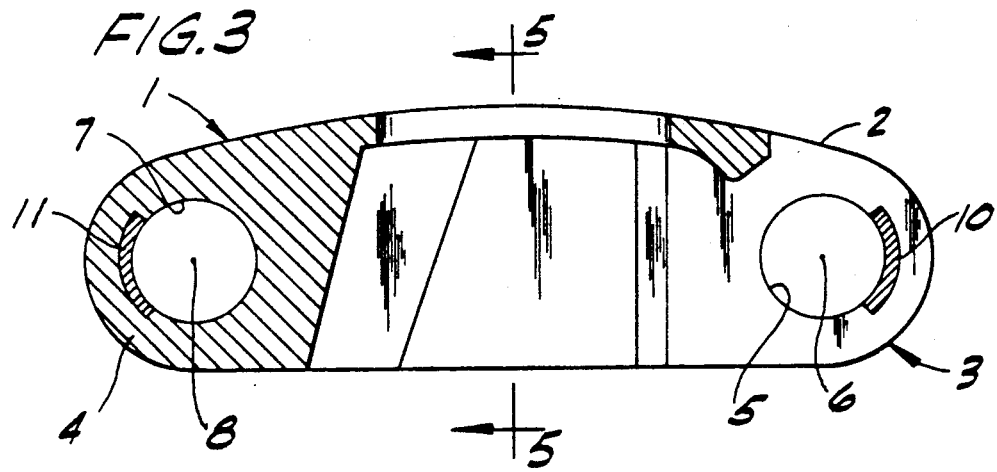

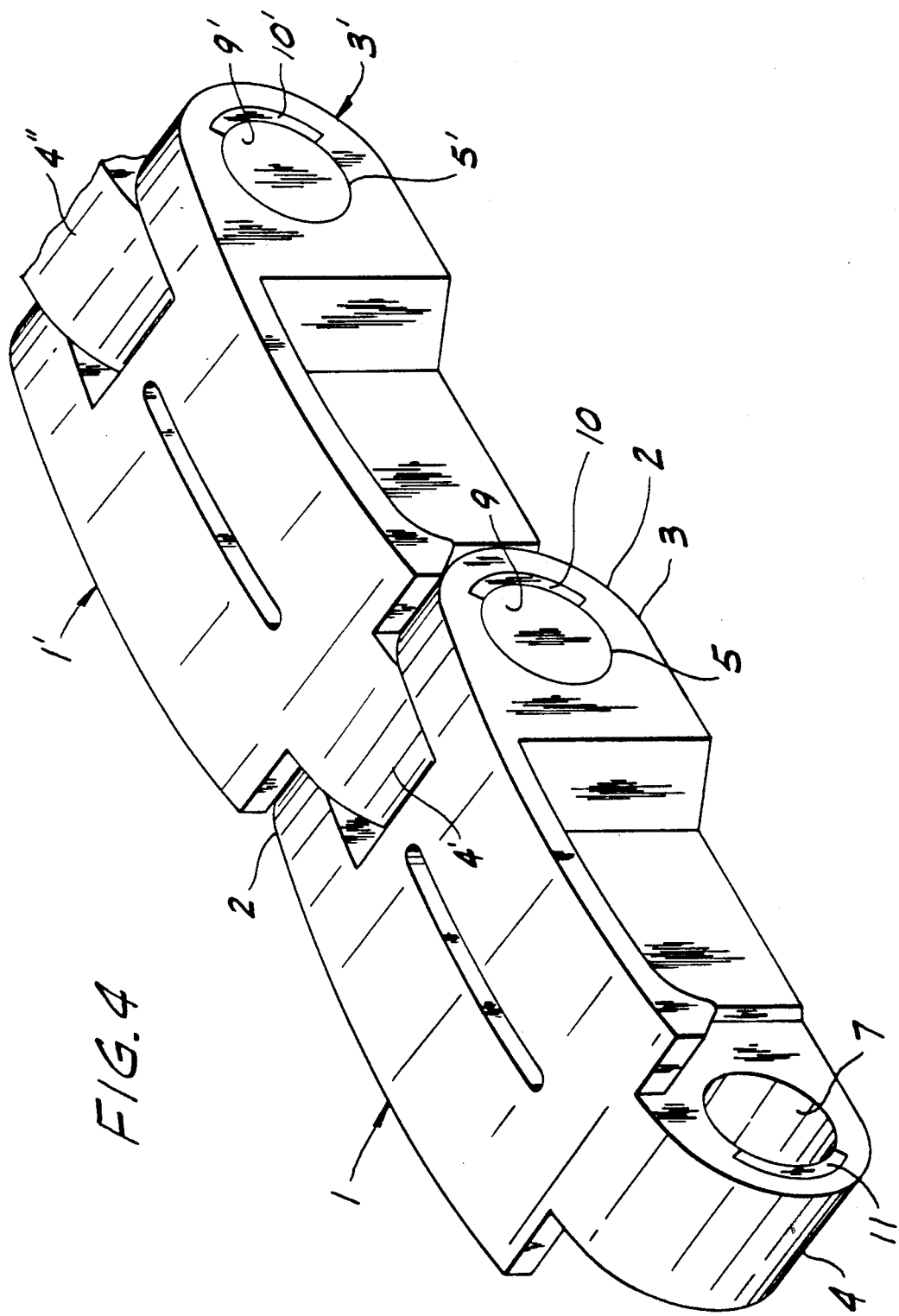

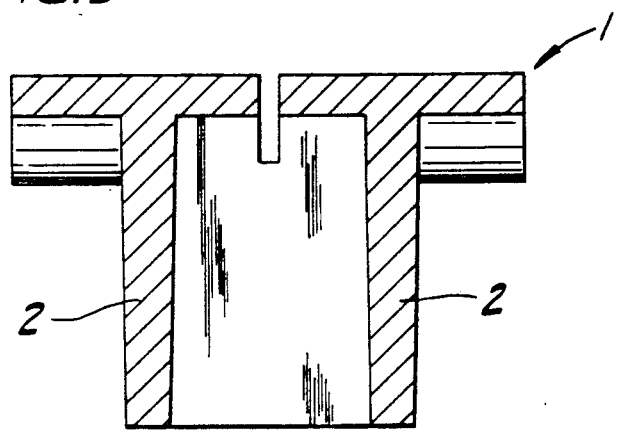
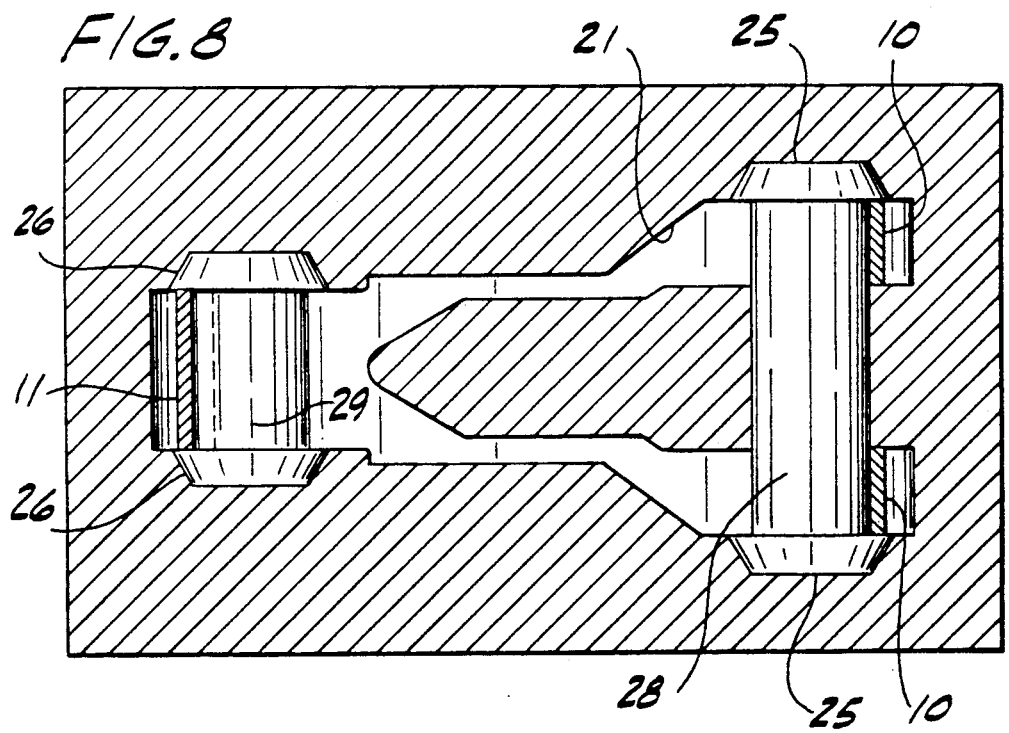

GRATE CONVEYOR LINK AND METHOD OF MANUFACTURE

BACKGROUND OF THE INVENTION

This invention relates to links for grate conveyors chains and a method of manufacturing the links.

The links to which this invention is directed are primarily for use as the links of chains for grate conveyors such as disclosed in U.S. Pat. No. 3,735,858 issued May 29, 1973, more particularly for a grate conveyor of the type referred to as a cooling grate conveyor for the cooling section of sintering apparatus in which iron ore, flux and solid fuel substances are continuously delivered upon the conveyor, ignited at one end, and fed forward on the conveyor, air being drawn down through the bed of material on the conveyor (i.e. through the conveyor grates) for some distance in the course of its travel to complete the sintering and partial fusion of the product.

In the prior art relating to grate conveyor chains, the pivotally connected links of the conveyor chains to which the grate members are connected are conventionally made of one-piece metal castings, including a pair of transversely spaced side walls formed at one of their ends to define a yoke portion, the chain bar sides merging at their opposite ends to define a neck or lug portion, the prior art chain link also including an integrally cast thin wall arched or web cover. The lug and the yoke portions contain circular connecting holes located on a transverse axis. The structure just described is one link in the prior art chain, and it will be understood that a plurality of such links are pivotally connected to each other with the neck portion of one chain link being received within the yoke portion of the next succeeding contiguous chain link. The plurality of pivotally connected chain links are known in the art as a "chain strand."

In the one-piece chain link construction of the prior art as just briefly described, a serious problem has arisen because of changes in operating temperatures and fluxing methods. In particular, the leading and trailing faces of the link holes wear from abrasion. In addition, the holes in the links tend to "egg" out in the direction of travel because the metal creeps or stretches at operating temperatures due to mechanical pulling tensions applied to the chain during normal movement of the conveyor and when the conveyor moves around an end sprocket or the like, or during the return run of the conveyor. Also, the links are attacked by the hot gases so that they tend to "scale" and lose thickness. Further, in the final stages of the sinter, temperatures as high as 2200° F. on the top of the product bed are encountered, and the links probably reach temperatures of the order of 1000° F. to perhaps 1500° F. As a result of these various conditions, the connecting portions of the links often fail by rupture through the wall sections of the connecting holes, generally in a transverse plane of the link and passing through the minimum thickness of the wall section of the link surrounding the hole.

Various ways of minimizing the rupture problem have been suggested. For example, some sintering machine manufacturer's have experimented with links made of SFSA-ACI castings of the ferritic straight iron-chromium types, but these have been disappointing due to their very poor hot strength. There have also been tests using the SFSA-ACI type HP, which contains nominally 35% Ni, 26% Cr and the balance mainly iron. This alloy has the highest hot strength of all of the ACI alloys, but is also very expensive due to its high Ni content. The most widely employed link alloy today is ACI type HF, which contains about 20% Cr, 10% Ni and the remainder mostly iron. Nevertheless, while this alloy has moderately good hot strength at operating temperatures it also shows a tendency to wear out in the connecting holes.

Another suggested solution to reduce the wear problem has been to employ hardened cylindric bushings or inserts of various steels in the connecting holes. In that approach the holes and the inserts have been machined to size. Unfortunately, this method is not only costly but also reduces the section thickness of the links around the bushings, so that the links tend to elongate and eventually rupture through the reduced wall sections. Even if rupture does not occur elongation causes misalignment of the links and gaps in the grate.

Attempts have also been made to reduce machining costs by placing rough, unmachined cylindric inserts in the mold prior to casting of the links. It was anticipated that the cast metal would fuse to the bushing during the casting process. The final internal hole could then be finish machined. This approach also failed because the solid insert bushing is heating and expanding while the casting around it attempts to cool and shrink. The walls of the casting tend to crack around the bushing during the cooling process.

Further, even those links that appear to be sound still tend to fail in service by rupturing through the wall sections that have been thinned by the presence of the bushings.

SUMMARY OF THE INVENTION

Accordingly, it is an object of the invention to provide an improved link for a grate conveyor or the like, which overcomes the elongation and rupture problem associated with the various prior art solutions to such problem, especially the use of bushings in the several connecting holes of the link. A further object is to provide such a link having increased service life.

In general, it is an object of this invention to provide an improved cast link, particularly a link for an endless grate conveyor in which a plurality of such chains are laterally spaced and carry rows of grates between each two adjacent chains. The improved link is an elongate casting having at a first end thereof a pair of transversely spaced side walls and at the other or second end thereof a lug having a width generally corresponding to the width of the space between said walls and extending out endwise at said second end. The lug is adapted to fit between the spaced side walls of the next link in a series of links making up the chain. The side walls have aligned holes therein of circular cross section coaxial on a first axis extending transversely of the link adjacent its first end. The lug also has a hole therein of circular cross section on a second axis extendidng transversely of the link adjacent its second end wherein the second axis is parallel to the first axis. As a result of the design, the hole in the lug of a link when fitted between the spaced walls of the next link in a chain of links is registerable with the holes in these side walls for reception of a pin which extends transversely of the conveyor for pivotally interconnecting the links of the chain. The link is cast of a metallic material and has inserts of a harder material extending partially around the circumference of each of the holes in said side walls at that side of each of those holes toward the first end of the link and an insert of a harder material extending partially around the circumference of the hole in the lug at that side of the hole toward the second end of the link. Each of the inserts forms a portion of the surface of the link in its respective hole.

Other objects and features of the invention will be in part apparent and in part pointed out hereinafter.

BRIEF DESCRIPTION OF THE DRAWINGS

FIG. 1 is a bottom plan view of a conveyor link of the invention;

FIG. 2 is a side elevation view of a conveyor link of the invention, showing its holes and inserts;

FIG. 3 is a view in transverse cross-section along the line "3—3" of FIG. 1;

FIG. 4 is an isometric view showing two chain links of the invention connected in pivotal relation to each other.

FIG. 5 is a transverse section generally on line 5—5 of FIG. 3;

FIG. 8 is a view similar to FIG. 7 showing the cores and inserts as inserted in the mold for casting the link with the holes and the inserts.

Corresponding reference characters indicate corresponding parts throughout the several views of the drawing.

DESCRIPTION OF THE PREFERRED EMBODIMENT

Figure 6:
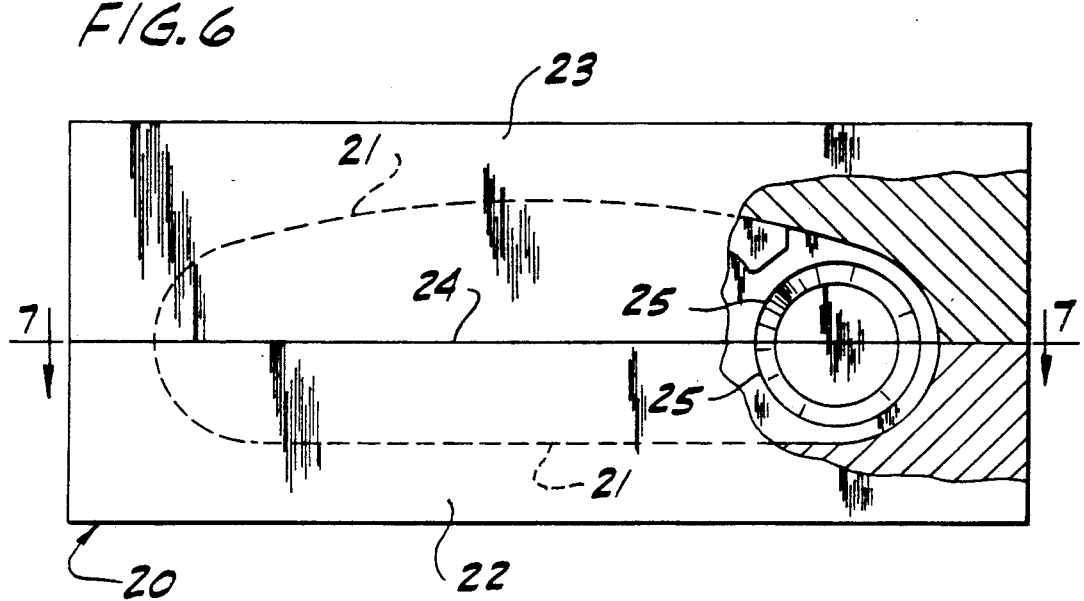
FIG. 6 is a view in side elevation illustrating a mold for molding a link in accordance with this invention, partly broken away.

Referring to FIGS. 1-5, there is shown one unit of a chain link generally indicated at 1 which is a casting of a suitable metal such as an alloy steel, or the like. Typical alloys include low steel alloys such as SAE-AISI types 8630 and 4140; ferritic iron-chromium steels such as SFSA-ACI and SFSA-ACI alloys types HP and HF. The link, shown in an elongate form, includes a pair of spaced side wall members transversely spaced from each other and indicated at 2. Side wall members 2 define the yoke portion 3 of a first end of the link. The two side wall members 2 converge together to form the lug or neck portion 4 at the other or second end of the link. The yoke portion 3 of the link is provided with aligned holes or passages 5 in the side walls thereof, of circular cross section coaxial on a first axis 6 extending transversely of the link. Similarly, the lug portion of the link, which is adapted to fit between the spaced side walls of an adjacent link, is provided with a hole or passage 7 of circular cross section on a second axis 8 extending transversely of the link. As shown in FIG. 4, when a chain link 1 and another chain link 1' are assembled together, the neck portion 4' of the member 1' is received within the yoke portion 2 of member 1, with the bearing passage 5 of the yoke member 1 aligned with the bearing passage 7' of the member 1' so that a chain pin or rod 9, can be received in the aligned bearing passages of the two members 1 and 1' to provide a pivotal connection between link 1 and link 1'. Chain pin 9 lies along a substantially horizontal axis.

Partial bushings 10, shown in a preferred embodiment of the invention, which also serve as abrasion resistant inserts in holes 5, extend partially around the circumference of these holes in the side walls 2 of the yoke portion 3 of the link and are positioned toward said first end of the link in said holes where increased wear occurs due to the direction of movement of the chain formed be a succession of links. Similarly, partial bushing 11, which serves as an abrasion resistant insert in hole 7, extends partially around the circumference of this hole in the lug portion 4 of the link and is positioned in said hole toward said second end of the link in said hole so as to be located in that portion of said hole where increased wear occurs, due to the direction of movement of the chain, i.e., toward the neck. The circumferential extent of partial bushings 10 and 11 is less than the circumferance of bearing holes 5 and 7, preferably less than half the circumference of said holes, and are positioned so as to avoid intersecting the vertical diametrical plane of the holes. As shown each partial bushing or insert is of part-cylindric form, concave on the inside, convex on the outside.

The partial bushings or inserts used in the chain links of the invention can be of hardened steel, but it is preferred that they be of a hardened metal alloy which is abrasion resistant and capable of withstanding exposure to temperatures of 1000°-1500° F. or possibly higher. Examples of those preferred alloys are Stellite No. 6, cemented carbide, tool steel, and the like.

Figure 7:
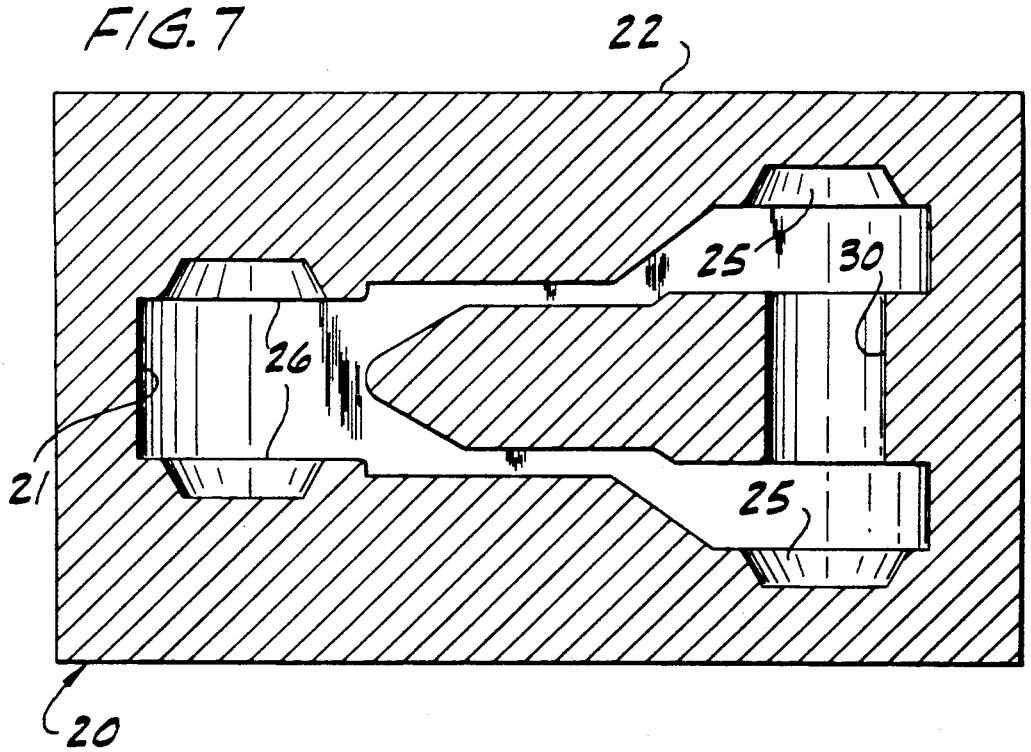
FIG. 7 is a view on line 7—7 of FIG. 6 showing the bottom half of the mold illustrating the cavity therein for the casting of the link.

Chain links 1 of this invention may be manufactured in accordance with this invention by the method of this invention illustrated in FIGS. 6-8 by sand molding. Modifications thereto with respect to other molding techniques will be apparent to those skilled in the art from the following description.

As illustrated in FIGS. 6-8, a mold 20, e.g. a sand mold is prepared with a cavity 21 therein corresponding in shape to the shape of the link, and with first core print cavities 25 and second core print cavities 26. The mold 20 is separable into two parts 22 and 23 on a parting line 24 through the first axis 6 and the second axis 8 of the link as described above. The first core print cavities 25 are formed by means of a pattern (not shown) on the first axis 6 at the location of the outer end of the hole in one of the side walls of the yoke and and at the location of the outer end of the hole in the other of said side walls of the yoke, said core print cavities 25 being aligned on said first axis 6 and being partly (half) in one part and partly (half) in the other part of the mold 20. The second core print cavities 26 are formed by means of a pattern (not shown) on the second axis 8 at the location of the outer ends of the hole 7 in said lug, said second core print cavities 26 being aligned on said second axis 8 and being partly (half) in one part and partly (half) in the other part of the mold 20. The mold parts 22 and 23 are then separated along the parting line 24.

As shown in FIG. 8, a core 28 for forming the holes 5 in the side walls 2 is placed in position extending between the first core print cavities 25 in mold part 22. The bushing inserts 10 for the holes 5 in the side walls 2 are placed on core 28 in position for being embedded in the side walls at the side of holes 5 in the side walls toward the said first end of the link. A core 29 for forming the hole 7 in the lug 4 is placed in position extending between the second core print cavities 26 in mold part 22 and a bushing insert 11 for hole 7 is placed on core 29 in position for being embedded in the lug at the side of the hole toward the second end of the link. The cores are cylindrical with heads at their ends received on the core print cavities. The inserts 10 and 11 can be attached to their respective cores prior to or after placing the cores in their respective core print cavities, e.g. they may be releasably secured to their respective cores 28 and 29 by core paste or other suitable means which will allow the insert to release from the core and become embedded in the casting. Since the holes 5 and 7 in the link, including the cast-in-place bushings 10 and 11, will usually be machined after the link is cast, the bushing inserts 10 and 11 as placed on the cores 28 and 29 are rough, i.e., unmachined on their concave surfaces. The mold parts 22 and 23 are then closed to form mold 20 with said cores 28 and 29, having their respective inserts 10 and 11 in the selected locations in place and the link cast by pouring metal into said mold, thereby forming the link with the inserts embedded at the selected locations in the holes of the link. The core 28, which forms the holes 5 in the side walls 2, is accommodated in recesses such as indicated at 30 of semi-circular cross section in the mold parts.

After the cast link is removed from the mold the holes 5 and 7 can be formed to the required dimensions by machining, in a single operation, the cast surface of the passages and the rough surface of the bearing insert. For various reasons it may be desireable to provided, in addition to inserts 10 and 11, additional bearing inserts in either holes 5 or hole 7 or both. In that situation the additional inserts will also be located partially around the circumference of the hole and generally opposite to inserts 10 and 11, as the case may be, preferably in a position which insures that they do not intersect the vertical plane of the holes.

Alternatively, the bushing can be added as a pressed-in insert. In that case a patterned core having an external rib along the longitudinal direction of the core is utilized. After the link is cast the bearing insert is pressed into the channel formed by the rib. The cast surface of the link plus bearing insert, which together form the holes 5 and 7, are then machined in a single machining operation.

The various dimensions and clearances of the links and the retaining pins are such that, when assembled into a chain, a reasonably close fit is permitted. Nevertheless, a limited amount of "play" will be present while at the same time maintaining the links and other parts forming a conveyor in assembled relation to each other as previously described and as shown in the drawings. The links are useful not only in sintering furnaces but also in all types of apparatus in which grate bars are moved and subjected to high temperatures, mechanical impact and tensions, and abrasive and chemically corrosive conditions.

By the present invention, links are provided in which partial bushings are provided in holes in the casting as it is poured without cracking the bushings. Also, the resultant link does not have thinned walls at the tops and bottoms of the holes where failure cracks occur in service as with the use of cylindric bushings. Thus the cast insert design provides the wear resistance required in the necessary areas of the holes but avoids thinning of the links in the areas where thinning causes service failure.

As various changes could be made in the above construction and method without departing from the spirit and scope of the invention, it is intended that all matter contained in the above description or shown in the accompanying views of the drawing shall be interpreted as illustrative and not in a limiting sense.

What is claimed is:

1. A link particularly for forming an endless chain for an endless grate conveyor comprising a plurality of such chains which are laterally spaced and which carry rows of grates between each two adjacent chains, said link comprising:

an elongate casting having toward one end thereof constituting its first end a pair of transversely spaced side walls and at the other end thereof constituting its second end a lug having a width generally corresponding to the width of the space between said walls and extending out endwise at said second end thereof, the lug being adapted to fit between the spaced side walls of the next link in a series of links making up the chain, the side walls having aligned holes therein of circular cross section coaxial on a first axis extending transversely of the link adjacent its said first end, the lug having a hole therein of circular cross section on a second axis extending transversely of the link adjacent its said second end, said second axis being parallel to said first axis, the hole in the lug of a link when fitted between spaced side walls of the next link in a chain of links being registrable with the holes in these side walls for reception of a pin which extends transversely of the conveyor for pivotally interconnecting the links of the chain, the link being cast of a metallic material and having inserts of a harder material extending partially around the circumference of each of the holes in said side walls at that side of each hole toward said first end of the link and an insert of a harder material extending partially around the hole in said lug at that side of this hole toward the second end of the link, each of said inserts forming a portion of the surface of the link in the respective hole and being embedded in said link.

2. A link as set forth in claim 1 wherein each insert extends around the respective opening for less than half the circumference of the opening.

3. A link as set forth in claim 1 wherein each insert is of part-cylindric form, convex on the outside thereof opposite its concave inside.

4. A link as set forth in claim 3 wherein each insert extends around its respective opening for less than half the circumference of the opening.

5. A link as set forth in claim 4 wherein each insert is positioned so as to avoid intersecting the diametrical plane coinciding with the vertical centerline of said holes.

6. A link as set forth in claim 5 wherein the concave cylindrical surface of each insert is a machined surface.

7. A link as set forth in claim 6 wherein the inner surface of each hole is a machined surface.

8. A link as set forth in claim 1 wherein the casting is formed from ACI type HF alloy.

9. A link as set forth in claim 5 wherein the casting is formed from ACI type HF alloy.

10. A link as set forth in any one of claims 1–7,8 or 9. wherein the inserts are formed from Sstellite No. 6.

* * * * *